(12) United States Patent
Andreuccetti et al.

(10) Patent No.: US 11,982,070 B2
(45) Date of Patent: May 14, 2024

(54) SYSTEM AND METHOD FOR HEATING THE HYDRAULIC FLUID OF AN ELECTRIC WORK VEHICLE

(71) Applicant: CNH Industrial America LLC, New Holland, PA (US)

(72) Inventors: Christopher Alan Andreuccetti, Burlington, IA (US); Joseph R. Shoemaker, West Burlington, IA (US); Nicholas Chibucos, Burlington, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/907,947

(22) PCT Filed: Feb. 26, 2021

(86) PCT No.: PCT/US2021/019830
§ 371 (c)(1),
(2) Date: Aug. 29, 2022

(87) PCT Pub. No.: WO2021/173940
PCT Pub. Date: Sep. 2, 2021

(65) Prior Publication Data
US 2023/0151584 A1 May 18, 2023

Related U.S. Application Data

(60) Provisional application No. 62/982,292, filed on Feb. 27, 2020.

(51) Int. Cl.
*E02F 9/20* (2006.01)
*E02F 9/22* (2006.01)
(Continued)

(52) U.S. Cl.
CPC ............ *E02F 9/2095* (2013.01); *E02F 9/226* (2013.01); *F15B 19/00* (2013.01);
(Continued)

(58) Field of Classification Search
CPC ..... E02F 9/2095; E02F 9/226; F15B 21/0427; F15B 2211/62; F15B 2211/66
See application file for complete search history.

(56) References Cited

U.S. PATENT DOCUMENTS

| 9,340,950 | B2 | 5/2016 | McWethy |
| 10,364,551 | B2 | 7/2019 | Fukuda et al. |

(Continued)

FOREIGN PATENT DOCUMENTS

| EP | 2192309 A2 | 6/2010 |
| EP | 2792796 A2 | 10/2014 |

(Continued)

OTHER PUBLICATIONS

International Search Report and Written Opinion for PCT Application No. PCT/US2021/019830 dated Jun. 15, 2021 (14 pages).

*Primary Examiner* — Abiy Teka
*Assistant Examiner* — Matthew Wiblin
(74) *Attorney, Agent, or Firm* — Rickard DeMille; Rebecca Henkel; Peter Zacharias

(57) ABSTRACT

An electric work vehicle includes a hydraulic actuator and a pump configured to supply hydraulic fluid to the hydraulic actuator, with the pump being operable within an operating speed range extending between a minimum operating speed value and a maximum operating speed value. Furthermore, the electric work vehicle includes a sensor configured to capture data indicative of a temperature of the hydraulic fluid and a controller communicatively coupled to the sensor. As such, the controller is configured to monitor the temperature of the hydraulic fluid relative to a predeter-
(Continued)

mined minimum fluid temperature as the pump is operating within the operating speed range. In addition, the controller is configured to adjust the operating speed range of the pump by increasing at least one of the minimum operating speed value or the maximum operating speed value when the monitored temperature of the hydraulic fluid falls below the predetermined minimum fluid temperature.

20 Claims, 3 Drawing Sheets

(51) Int. Cl.
*F15B 19/00* (2006.01)
*F15B 21/0427* (2019.01)
*E02F 3/96* (2006.01)

(52) U.S. Cl.
CPC .......... *F15B 21/0427* (2019.01); *E02F 3/964* (2013.01); *F15B 2211/20515* (2013.01); *F15B 2211/62* (2013.01); *F15B 2211/6343* (2013.01); *F15B 2211/66* (2013.01); *F15B 2211/6651* (2013.01)

(56) References Cited

U.S. PATENT DOCUMENTS

| | | | |
|---|---|---|---|
| 2006/0150621 A1* | 7/2006 | Nakata | F15B 21/0427 374/E3.007 |
| 2008/0254939 A1* | 10/2008 | Ichimura | E02F 9/2246 477/107 |
| 2013/0174539 A1 | 7/2013 | Ezawa et al. | |
| 2014/0271073 A1 | 9/2014 | Mueller | |
| 2015/0308469 A1* | 10/2015 | Beschorner | F15B 19/00 60/327 |
| 2017/0370073 A1 | 12/2017 | Fukuda et al. | |
| 2019/0331144 A1* | 10/2019 | Kim | E02F 9/22 |
| 2019/0345691 A1 | 11/2019 | Haberman et al. | |
| 2021/0285187 A1* | 9/2021 | Jagoda | E02F 9/265 |

FOREIGN PATENT DOCUMENTS

| | | |
|---|---|---|
| EP | 3556947 A1 | 10/2019 |
| JP | 03177604 A | 8/1991 |
| JP | 2000074011 A | 3/2000 |
| WO | 2010/025354 A2 | 3/2010 |
| WO | 2019/170343 A1 | 9/2019 |

* cited by examiner

SYSTEM AND METHOD FOR HEATING THE HYDRAULIC FLUID OF AN ELECTRIC WORK VEHICLE

FIELD OF THE INVENTION

The present disclosure generally relates to electric work vehicles and, more particularly, to systems and methods for heating the hydraulic fluid of an electric work vehicle, such as an electric backhoe loader, during low temperature operation.

BACKGROUND OF THE INVENTION

Work vehicles, such as backhoe loaders, wheel loaders, skid steer loaders, compact track loaders, and the like, are a mainstay of construction work and industry. As such, work vehicles typically include one or more implements for carrying materials, such as gravel, sand, or dirt, around a worksite. For example, backhoe loaders include a chassis, a loader assembly coupled to the front of the chassis, and a backhoe assembly coupled to the rear of the chassis. Moreover, work vehicles include a hydraulic system having one or more hydraulic cylinders for raising and lowering each implement relative to the chassis.

When operating a work vehicle in low temperature conditions, it is important to ensure the temperature of the hydraulic fluid supplied to the hydraulic cylinders is above a minimum temperature. When the temperature of the hydraulic fluid falls below the minimum temperature, the hydraulic fluid may be too viscous to be properly pumped through the hydraulic system of the work vehicle. In this respect, heat from the internal combustion engine of the work vehicle is typically used to heat the hydraulic fluid when ambient temperatures are low. However, electric work vehicles do not include an internal combustion engine or other device that generates significant amounts of excess heat that can be used to heat the hydraulic fluid.

Accordingly, a system and method for heating the hydraulic fluid of an electric work vehicle would be welcomed in the technology. In particular, a system and method for heating the hydraulic fluid of an electric work vehicle during low temperature operation would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an electric work vehicle. The electric work vehicle includes a chassis and an electric motor supported on the chassis, with the electric motor configured to propel the electric construction vehicle in a direction of travel. Additionally, the electric work vehicle includes an implement adjustably coupled to the chassis and a hydraulic actuator configured to adjust a position of the implement relative to the chassis. Furthermore, the electric work vehicle includes a pump configured to supply hydraulic fluid to the hydraulic actuator, with the pump being operable within an operating speed range extending between a minimum operating speed value and a maximum operating speed value. Moreover, the electric work vehicle includes a sensor configured to capture data indicative of a temperature of the hydraulic fluid and a controller communicatively coupled to the sensor. As such, the controller is configured to monitor the temperature of the hydraulic fluid relative to a predetermined minimum fluid temperature as the pump is operating within the operating speed range. In addition, the controller is configured to adjust the operating speed range of the pump by increasing at least one of the minimum operating speed value or the maximum operating speed value when the monitored temperature of the hydraulic fluid falls below the predetermined minimum fluid temperature.

In another aspect, the present subject matter is directed to a system for heating hydraulic fluid of an electric work vehicle. The system includes a pump configured to supply hydraulic fluid to a component of the electric work vehicle. Additionally, the system includes a sensor configured to capture data indicative of a temperature of the hydraulic fluid and a controller communicatively coupled to the sensor. As such, the controller is configured to monitor the temperature of the hydraulic fluid relative to a predetermined minimum fluid temperature based on data received from the sensor. Furthermore, the controller is configured to adjust an operating speed range of the pump when the monitored temperature of the hydraulic fluid falls below the predetermined minimum fluid temperature.

In a further aspect, the present subject matter is directed to a method for heating hydraulic fluid of an electric work vehicle. The electric work vehicle, in turn, includes a pump configured to supply the hydraulic fluid to a component of the electric work vehicle. The method includes receiving, with one or more computing devices, sensor data indicative of a temperature of the hydraulic fluid. Furthermore, the method includes monitoring, with the one or more computing devices, the temperature of the hydraulic fluid relative to a predetermined minimum fluid temperature based on the received sensor data. Moreover, when the monitored temperature of the hydraulic fluid falls below the predetermined minimum fluid temperature, the method includes adjusting, with the one or more computing devices, an operating speed range of the pump.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
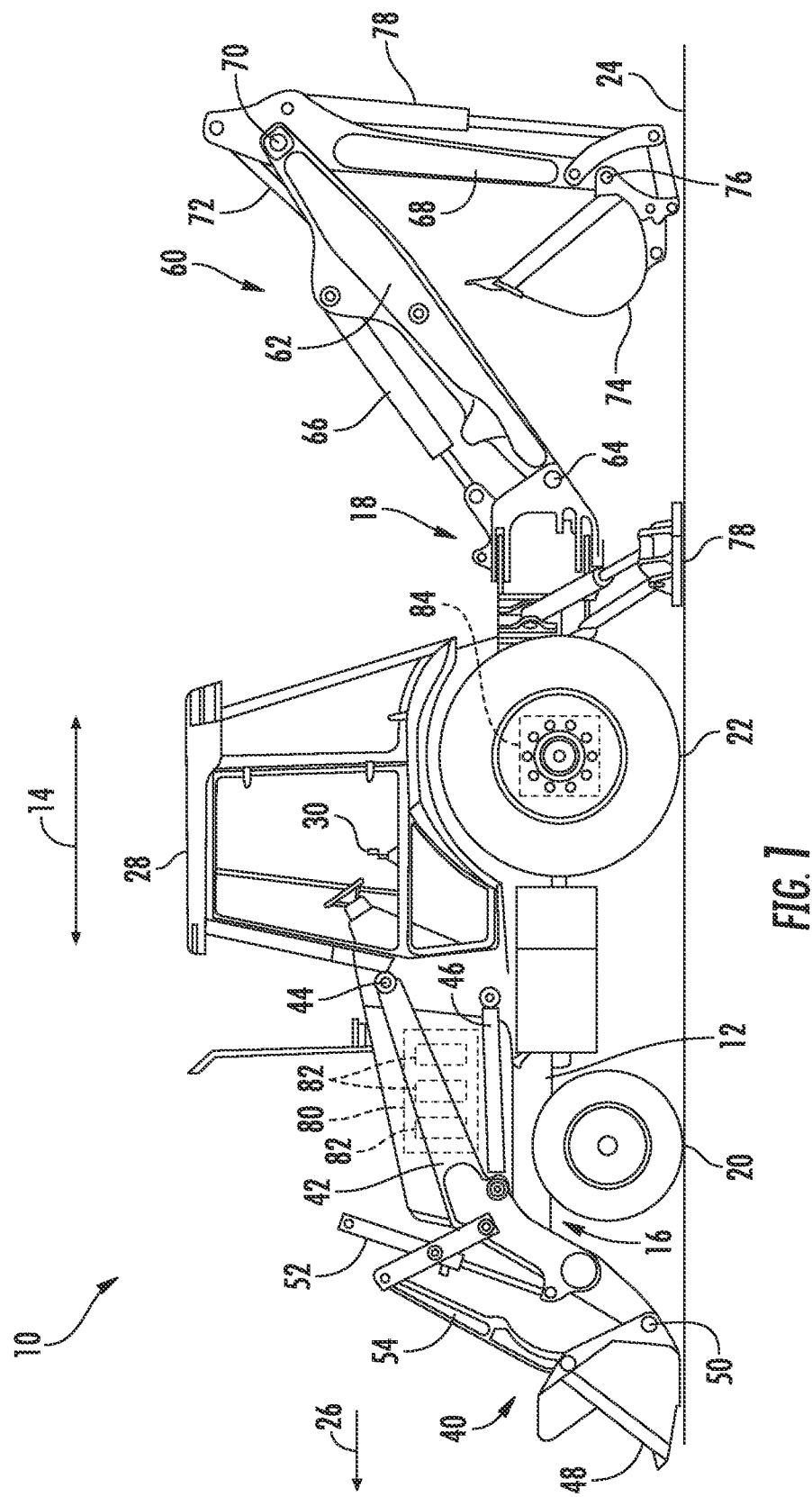
FIG. 1 illustrates a side view of one embodiment of electric work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for heating hydraulic fluid of an electric work vehicle. As will be described below, the present subject matter may be used with an electric backhoe loader or any other electric work vehicle that uses hydraulic fluid to operate one or more of its components. In this respect, the electric work vehicle may include one or more hydraulic actuators configured to adjust the position(s) of one or more implements (e.g., a loader assembly and/or a backhoe assembly) relative to a chassis of the vehicle. Moreover, the electric work vehicle may include a pump configured to supply hydraulic fluid to the hydraulic actuator(s), with the pump being operable within an operating speed range extending between a minimum operating speed value and a maximum operating speed value.

In accordance with aspects of the present subject matter, a controller of the disclosed system may be configured to adjust the operating speed range of the pump to heat the hydraulic fluid of the work vehicle. Specifically, in several embodiments, the controller may be configured to monitor the temperature of the hydraulic fluid supplied by the pump relative to a predetermined minimum fluid temperature. Thereafter, when the monitored temperature falls below the predetermined minimum fluid temperature, the controller may be configured to adjust the operating speed range of the pump. For example, the controller may be configured to adjust the operating speed range of the pump by increasing the minimum operating speed value and/or the maximum operating speed value of the operating speed range of the pump. Adjusting the operating speed range of the pump when the temperature of the hydraulic fluid is below the predetermined minimum fluid temperature may, in turn, ensure the pump is operating at an operating speed sufficient to quickly heat the hydraulic fluid, while minimizing energy consumption of the electric work vehicle.

Referring now to the drawings, FIG. 1 illustrates a side view of one embodiment of an electric work vehicle in accordance with aspects of the present subject matter. As shown, the electric work vehicle is configured as an electric backhoe loader 10 (also often referred to as a "tractor-loader-backhoe" (TLB) or a "loader backhoe"). However, in other embodiments, aspects of the present subject matter may also be utilized within other electric work vehicles, such as various other construction vehicles. For instance, in one embodiment, aspects of the present subject matter may be advantageously utilized with other electric construction vehicles including at least one hydraulically-driven work implement assembly, such as a wheel loader, a skid-steer loader, and/or a bulldozer.

As shown in FIG. 1, the backhoe loader 10 includes a frame or chassis 12 extending in a longitudinal direction (indicated by arrow 14 in FIG. 1) of the vehicle 10 between a forward end 16 of the chassis 12 and an aft end 18 of the chassis 12. In general, the chassis 12 may be configured to support or couple to a plurality of components. For example, a pair of steerable front traction devices (e.g., front wheels 20 (one of which is shown)) and a pair of driven rear traction devices (e.g., rear wheels 22 (one of which is shown)) may be coupled to the chassis 12. The wheels 20, 22 may be configured to support the backhoe loader 10 relative to a ground surface 24 and move the loader 10 along the ground surface 24 in a direction of travel, such as a forward direction of travel (e.g., as indicated by arrow 26 in FIG. 1). However, in alternative embodiments, the front wheels 20 may be driven in addition to or in lieu of the rear wheels 22. Additionally, an operator's cab 28 may be supported by a portion of the chassis 12 positioned between the forward and aft ends 16, 18 of the chassis 12, and may house one or more operator control devices 30 (e.g., a joystick(s), a lever(s), and/or the like) for permitting an operator to control the operation of the backhoe loader 10.

The backhoe loader 10 also includes a pair of hydraulically-driven work implement assemblies positioned at the opposed ends 16, 18 of the chassis 12. Specifically, in the illustrated embodiment, the backhoe loader 10 includes a loader assembly 40 supported by or relative the chassis 12 at or adjacent to its forward end 16. As shown in FIG. 1, the loader assembly 40 includes a loader arm 42 pivotably coupled or supported relative to the chassis 12 at a loader arm pivot point 44, and a loader lift cylinder 46 secured between the loader arm 42 and the chassis 12. In such an embodiment, extension/retraction of the loader lift cylinder 46 may result in the loader arm 42 pivoting upwards/downwards about its respective pivot point 44, thereby allowing the positioning of the loader arm 42 relative to both the chassis 12 and the ground surface 24 to be adjusted, as desired. Moreover, as shown in FIG. 1, the loader assembly 40 further includes a first work implement 48, such as a loader bucket, coupled to the loader arm 42 at an implement pivot point 50, and a first implement tilt cylinder 52 secured between the work implement 48 (e.g., via a linkage(s) 54) and a portion of the loader arm 44. As such, extension/retraction of the first implement tilt cylinder 52 may result in the first work implement 48 pivoting upwards/downwards relative to the loader arm 42 about its respective pivot point 50, thereby permitting the tilt angle or orientation of the implement 48 to be adjusted, as desired. Thus, by controlling the operation of the lift and tilt cylinders 46, 52 of the loader assembly 40, the vertical positioning and orientation of the first work implement 48 may be adjusted to allow for the execution of one or more operations, such as one or more material-moving operations.

Additionally, the backhoe loader 10 includes a backhoe assembly 60 supported by or relative to the chassis 12 at or adjacent to its aft end 18. As shown in FIG. 1, the backhoe assembly 60 includes a boom 62 pivotably coupled or supported relative to the chassis 12 at a boom pivot point 64, and a boom lift cylinder 66 secured between the boom 62 and the chassis 12. In such an embodiment, extension/retraction of the boom cylinder 66 may result in the boom 62 pivoting upwards/downwards about its respective pivot point 64, thereby allowing the positioning of the boom 62 relative to both the chassis 12 and the ground surface 24 to be adjusted, as desired. The backhoe assembly 60 also includes a dipper arm 68 coupled to the boom 62 at a dipper pivot point 70, and a dipper cylinder 72 secured between the dipper arm 68 and the boom 62. In such an embodiment, extension/retraction of the dipper cylinder 72 may result in the dipper arm 68 pivoting upwards/downwards about its respective pivot point 70 relative to the boom 62. Moreover, as shown in FIG. 1, the backhoe assembly 60 further includes a second work implement 74, such as a dipper bucket, coupled to the dipper arm 68 at an implement pivot point 76, and a second implement tilt cylinder 78 secured between the work implement 74 and a portion of the dipper arm 68. As such, extension/retraction of the second implement tilt cylinder 78 may result in the second work implement 74 pivoting upwards/downwards relative to the dipper arm 68 about its respective pivot point 76, thereby permitting the tilt angle or orientation of the implement 74 to be adjusted, as desired. Thus, by controlling the operation of the various cylinders 66, 72, 78 of the backhoe assembly 60, the vertical positioning and orientation of the second work implement 74 may be adjusted to allow for the execution of one or more operations, such as one or more material excavation operations.

As shown in FIG. 1, the backhoe loader 10 may also include a pair of stabilizer legs 78 (one of which is shown) positioned at or adjacent to the aft end 18 of the chassis 12. The stabilizer legs 78 may be configured to support the weight of the backhoe loader 10 and/or otherwise stabilize the loader 10 during the performance of a backhoe-related operation. For instance, the stabilizer legs 78 may be pivotably coupled to the chassis 12 to allow the legs 78 to be moved or pivoted (e.g., via the operation of an associated stabilizer leg cylinder 78) between a lowered position, at which the legs 78 contact the ground surface 24, and a raised position, at which the legs 78 are lifted off the ground surface 24 to allow movement of the backhoe loader 10 (e.g., in the forward direction of travel 26). In addition to lowering the stabilizer legs 78, the loader assembly 40 may also be lowered during the performance of a backhoe-related operation such that the first work implement 48 contacts the ground, thereby providing a point-of-contact to stabilize the front end 16 of the chassis 12.

Furthermore, the backhoe loader 10 may include an electric drivetrain configured to propel the loader 10 in the direction of the travel 26. For example, in the illustrated embodiment, the electric drivetrain includes a power storage device, such as a battery module 80 having three batteries 82, supported on and positioned adjacent to the forward end 16 of the chassis 12. Moreover, in the illustrated embodiment, the electric drivetrain includes a pair of electric traction motors 84 (one of which is shown) supported on the chassis 12, with each motor 84 coupled to one of the driven wheels 22 via a suitable shaft (not shown). More specifically, the batteries 82 may be configured to provide electric power for use in powering the electric traction motors 84 and other power-consuming components of the vehicle 10 (e.g., an electric hydraulics-driving motor 102 (FIG. 2) of the loader 10). Each electric traction motor 84 may, in turn, rotationally drive the corresponding rear wheel 22, thereby propelling the backhoe loader 10 in the forward direction of travel 26. However, in alternative embodiments, the electric drivetrain of the backhoe loader 10 may have any other suitable configuration. For example, in one embodiment, the backhoe loader 10 may include as a single electric traction motor coupled to a transmission (not shown) that transmits the torque generated by the electric traction motor to each of the rear wheels 22. In another embodiment, the backhoe loader 10 may include an electric traction motor coupled to each of the wheels 20, 22. Furthermore, the battery module 80 may include any other suitable number of batteries 82.

In addition, the backhoe loader 10 may include various components for controlling the operation of the electric drivetrain. For instance, although not shown, one or more power inverters may be coupled to the battery module 80 via a direct current (DC) voltage bus or any other suitable electrical coupling for converting the direct current supplied by the batteries 82 of the battery module 80 to an alternating current (AC) for powering the electric traction motors 84 and the electric hydraulics-driving motor 102. An associated motor/inverter controller(s) may control the operation of the power inverter(s) in a manner that drives each electric motor 84, 102 as desired, such as by ensuring that each motor 84, 102 is driven to achieve a desired speed and/or torque output.

The configuration of the electric work vehicle 10 described above and shown in FIG. 1 is provided only to place the present subject matter in an exemplary field of use. Thus, the present subject matter may be readily adaptable to any manner of electric vehicle configuration. For instance, in addition to a backhoe loader, aspects of the present subject matter may also be applied within electric construction vehicles only including a single work implement assembly positioned at one end of the vehicle's chassis, such as a wheel loader, skid-steer loader, bulldozer, and/or the like.

Figure 2:
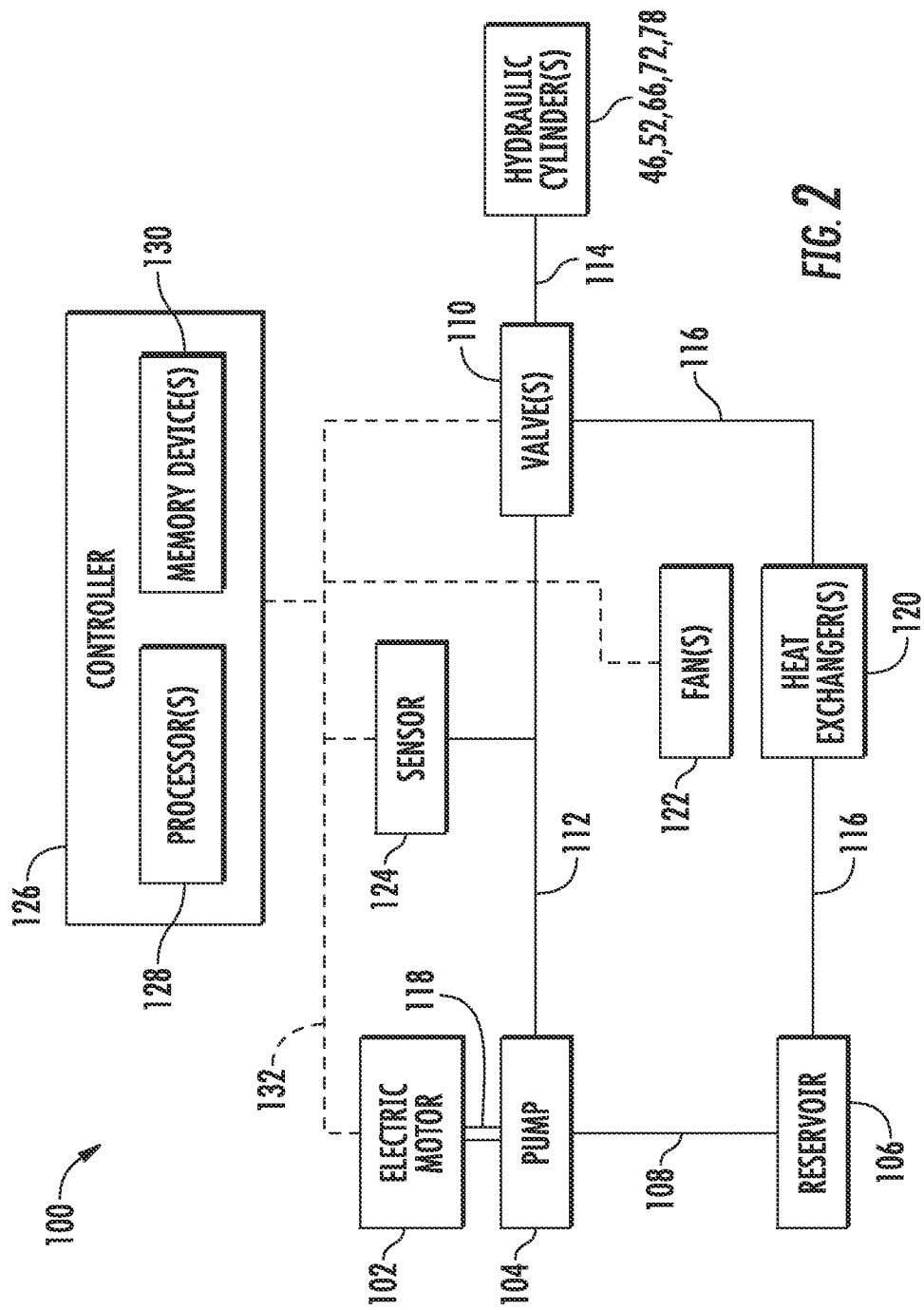
FIG. 2 illustrates a schematic view of one embodiment of a system for heating the hydraulic fluid of an electric work vehicle in accordance with aspects of the present subject matter.

Referring now to FIG. 2, a schematic view of one embodiment of a system 100 for heating the hydraulic fluid of an electric work vehicle is illustrated in accordance with aspects of the present subject matter. In general, the system 100 will be described herein with reference to the electric work vehicle 10 described above with reference to FIG. 1. However, the disclosed system 100 may generally be utilized with electric work vehicle having any other suitable electric vehicle configuration. For purposes of illustration, hydraulic connections between components of the system 100 are shown in solid lines, while electrical connections between components of the system 100 are shown in dashed lines.

As shown in FIG. 2, the system 100 may include various components of the hydraulic system of the backhoe loader 10. In several embodiments, the system 100 may include a pump 104 configured to supply hydraulic fluid to one or more hydraulic actuators of the loader 10, such as the hydraulic cylinders 46, 52, 66, 72, 78. More specifically, the pump 104 may be in fluid communication with a fluid tank or reservoir 106 (via a pump line 108) and one or more control valves 110 (e.g., via a supply line 112). The control valve(s) 106 may, in turn, be in fluid communication with the hydraulic cylinders 46, 52, 66, 72, 78 (e.g., via the cylinder lines 114—one is shown in FIG. 2) and the reservoir 108 (e.g., via a return line 116). In this respect, the pump 104 may be configured to receive hydraulic fluid from the reservoir 106 (e.g., via the pump line 108) and discharge a pressurized flow of the hydraulic fluid into the supply line 112. The control valve(s) 106 may regulate the flow of the pressurized hydraulic fluid from the supply line 112 to each of the hydraulic cylinders 46, 52, 66, 72, 78. By regulating the flow of hydraulic fluid generated by the pump 104 (e.g., by controlling the operation of the pump 104 and/or the control valve(s) 110), the movement of the loader assembly 40 and the backhoe assembly 60 may be to be controlled. In addition, the control valve(s) 110 may regulate the return of the hydraulic fluid from the hydraulic cylinders 46, 52, 66, 72, 78 to the reservoir 106.

The pump 104 may be operable within an operating speed range (e.g., a rotational speed range of an impeller of the pump 104) to pressurize the received hydraulic fluid for supply to the hydraulic cylinders 46, 52, 66, 72, 78. In general, the operating speed range may extend between a minimum operating speed value (e.g., a minimum rotational speed value of the impeller) and a maximum operating speed value (e.g., a minimum rotational speed value of the impeller). By operating pump 104 within the operating speed range, the pump 104 may discharge hydraulic fluid within a range of pressures into the supply line 112. In this respect, the operating speed of the pump 104 may be adjusted within the operating speed range based on the load placed on the hydraulic system of the backhoe loader 10. For example, the operating speed of the pump 104 may be increased toward the maximum operating speed value to increase the pressure of the hydraulic fluid discharged by the pump 104, thereby allowing the hydraulic system to handle a greater load (e.g., due to movement of the hydraulic cylinders 46, 52, 66, 72, 78). Conversely, the operating speed of the pump 104 may be decreased toward the minimum operating speed value to decrease the pressure of the hydraulic fluid discharged by the pump 104, thereby reducing the power consumption of the backhoe loader 10 when the hydraulic system operating at lower loads. As will be described below, the operating speed range of the pump 104 may be adjusted when the temperature of the hydraulic fluid in the hydraulic system falls below a predetermined minimum fluid temperature to quickly heat the hydraulic fluid.

In several embodiments, the pump 104 may be driven by an electric hydraulics-driving motor 102. More specifically, in such embodiments, the electric hydraulics-driving motor 102 may be powered by the battery module 80 (FIG. 1) and mechanically coupled to the pump 104 via an output shaft 118. In this respect, a motor/inverter controller and associated power inverter may control the operation of the electric hydraulics-driving motor 102 such that the electric hydraulics-driving motor 102 rotationally drives the impeller of the pump 104 at an operating speed within the operating speed range based on the load applied to the hydraulic system of the backhoe loader 10.

Figure 3:
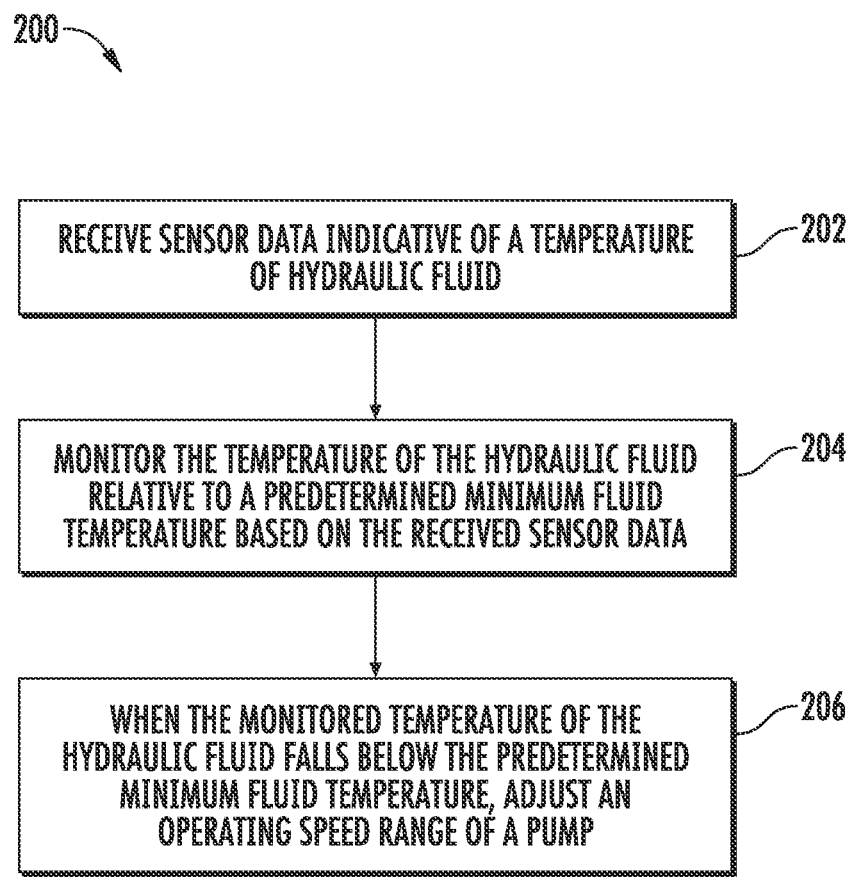
FIG. 3 illustrates a flow diagram of one embodiment of a method for heating the hydraulic fluid of an electric work vehicle in accordance with aspects of the present subject matter.

Referring still to FIG. 3, the system 100 may include one or more heat exchangers 120 for cooling the hydraulic fluid flowing through the hydraulic system of the backhoe loader 10. Additionally, as shown, one or more electric cooling fans 122 (e.g., an array of cooling fans, such as a 2×2 array or a 4×4 array) may be positioned adjacent to the heat exchanger(s) 120 for generating an airflow through the heat exchanger(s) 120. The airflow generated by the electric cooling fans 122 may also, in one embodiment, be directed around other components (e.g., the battery module 80 and/or other heat exchangers) to provide a cooling airflow thereto. In one embodiment, the electric cooling fans 122 may correspond to DC-powered cooling fans to allow the battery module 80 to serve as a direct power source for the fans 122.

Furthermore, the system 100 may include a temperature sensor 124 in operative association with the hydraulic system of the backhoe loader 10. In general, the temperature sensor 124 may be configured to capture data indicative of the temperature of the hydraulic fluid within the hydraulic system. For example, in several embodiments, the temperature sensor 124 may be configured as a thermocouple or a thermistor. Moreover, in the illustrated embodiment, the temperature sensor 124 is in operative association with supply line 112 such that the temperature sensor 124 is in contact with the hydraulic fluid flowing through the supply line 112. However, in alternative embodiments, the temperature sensor 124 be configured as any other suitable device for capturing data indicative of the temperature of the hydraulic fluid and/or be in operative association with any other suitable component of the hydraulic system.

In accordance with aspects of the present subject matter, the system 100 may include a controller 126 positioned on and/or within or otherwise associated with the backhoe loader 10. In general, the controller 126 may comprise any suitable processor-based device known in the art, such as a computing device or any suitable combination of computing devices. Thus, in several embodiments, the controller 126 may include one or more processor(s) 128 and associated memory device(s) 130 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 130 of the controller 126 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 130 may generally be configured to store suitable computer-readable instructions that, when implemented by the processor(s) 128, configure the controller 126 to perform various computer-implemented functions.

In addition, the controller 126 may also include various other suitable components, such as a communications circuit or module, a network interface, one or more input/output channels, a data/control bus and/or the like, to allow controller 126 to be communicatively coupled to any of the various other system components described herein (e.g., the electric hydraulics-driving motor 102 (or an associated inverter), the valve(s) 110, the fan(s) 122, and/or the temperature sensor 124). For instance, as shown in FIG. 2, a communicative link or interface 132 (e.g., a data bus) may be provided between the controller 126 and the components 102, 110, 122, 124 to allow the controller 126 to communicate with such components 102, 110, 122, 124 via any suitable communications protocol (e.g., CANBUS).

The controller 126 may correspond to an existing controller(s) of the backhoe loader 10, itself, or the controller 126 may correspond to a separate processing device. For instance, in one embodiment, the controller 126 may form all or part of a separate plug-in module that may be installed in association with the backhoe loader 10 to allow for the disclosed systems to be implemented without requiring additional software to be uploaded onto existing control devices of the backhoe loader 10.

The functions of the controller 126 may be performed by a single processor-based device or may be distributed across any number of processor-based devices, in which instance such devices may be considered to form part of the controller 126. For instance, the functions of the controller 126 may be distributed across multiple application-specific controllers, such as a vehicle controller, a hydraulic system controller, an electric traction motor controller/electric traction motor inverter controller, an electric hydraulics-driving motor controller/electric hydraulics-driving motor inverter controller, and/or the like.

In several embodiments, the controller 126 may be configured to monitor the temperature of the hydraulic fluid within the hydraulic system of the backhoe loader 10. As described above, the backhoe loader 10 may include a temperature sensor 124 configured to capture data indicative of the temperature of the hydraulic fluid. In this respect, during operation of the backhoe loader 10, the controller 126 may be configured to receive the captured data from the temperature sensor 124 (e.g., via the communicative link 132). Thereafter, the controller 126 may be configured to process/analyze the received sensor data to determine the temperature of the hydraulic fluid within the hydraulic system. For instance, the controller 126 may include a look-up table(s) and/or suitable mathematical formula stored within its memory device(s) 130 that correlates the received sensor data to the temperature of the hydraulic fluid.

In accordance with aspects of the present subject, the controller 126 may be configured to adjust the operating speed range of the pump 104 when the monitored temperature of the hydraulic fluid falls below a predetermined minimum fluid temperature. As described above, the pump 104 is operable within an operating speed range to pressurize the hydraulic fluid within the hydraulic system of the backhoe loader 10 for supply to the various hydraulic actuators of the loader 10, such as the hydraulic cylinders 46, 52, 66, 72, 78. However, when the temperature of the hydraulic fluid is too low (e.g., due to low ambient temperature and/or start-up of the backhoe loader 10), the hydraulic fluid may be too viscous to properly flow through the hydraulic system of the backhoe loader 10. Continuous operation of the hydraulic system when the hydraulic fluid is too viscous may, in turn, accelerate the rate at which the pump 104 and/or other hydraulic system components incur wear. In this respect, the controller 126 may be configured to compare the monitored temperature of the hydraulic fluid to the predetermined minimum fluid temperature. Thereafter, when the monitored temperature of the hydraulic fluid falls below the predetermined minimum fluid temperature (thereby indicating that the hydraulic fluid is too cold and, thus, too viscous), the controller 126 may be configured to adjust the operating speed range of the pump 104. As will be described below, such an adjustment of the operating speed range of the pump 104 may rapidly heat the hydraulic fluid, thereby decreasing its viscosity and allowing the hydraulic fluid to flow through the hydraulic system of the backhoe loader 10.

In several embodiments, the controller 126 may be configured to increase the minimum or maximum operating speed values of the pump 104 when the monitored temperature of the hydraulic fluid falls below a predetermined minimum fluid temperature. For example, in one embodiment, the controller 126 may be configured to increase the minimum operating speed value of the pump 104 in such instances. Increasing the minimum operating speed value may, in turn, prevent the operating speed of the pump 104 from dropping below an operating speed that quickly heats the hydraulic fluid when the load on the hydraulic system is low. In another embodiment, the controller 126 may be configured to increase the maximum operating speed value of the pump 104, such as to the maximum speed at which the pump 104 is capable of operating, when the monitored temperature of the hydraulic fluid falls below a predetermined minimum fluid temperature. Increasing the maximum operating speed value may, in turn, allow the pump 104 to operate at an operating speed above its normal operation speed range to more quickly heat the hydraulic fluid.

Additionally, in some embodiments, the controller 126 may be configured adjust the operating speed range of the pump 104 from a first or lower operating speed range to a second or higher operating speed range of the pump 104 when the monitored temperature of the hydraulic fluid falls below a predetermined minimum fluid temperature. In general, the minimum and maximum operating speed values of the higher operating speed range may be greater than the minimum and maximum operating speed values of the lower operating speed range, respectively. Adjusting from the lower operating speed range to the higher operating speed range may, in turn, allow the pump 104 to operate as if a higher load were placed on the hydraulic system, thereby more quickly heat the hydraulic fluid. For example, in one embodiment, when the monitored temperature of the hydraulic fluid falls below a predetermined minimum fluid temperature, the operating speed range may be adjusted from a first range (e.g., 800-1000 rpm) associated with a low hydraulic system load to a second range (e.g., 900-1100 rpm) associated with a high hydraulic system load. However, in alternative embodiments, the minimum operating speed value of the higher range may be greater than the maximum operating speed value of the lower operating range.

Furthermore, the controller 126 may be configured to control the operation of the pump 104 based on the adjusted operating speed range. Specifically, the controller 126 may be configured to compare the current operating speed of the pump 104 to the adjusted operating speed range. Thereafter, when the current operating speed of the pump 104 falls outside of the adjusted operating speed range (thereby indicating the operating speed of the pump 104 is too low to quickly heat the hydraulic fluid), the controller 126 may be configured to initiate an adjustment to the current operating speed of the pump 104. For example, as described above, in several embodiments, the pump 104 may be driven by the electric hydraulics-driving motor 102. In such embodiments, the controller 126 may transmit suitable controls signals to an inverter of the electric hydraulics-driving motor 102 instructing the inverter to increase the voltage of the electric power supplied to the motor 102, thereby increasing the operating speed of the pump 104. The increased operating speed of the pump 104 may, in turn, increase the rate at which the hydraulic fluid is heated due to the increased friction between the impeller of the pump 104 and the hydraulic fluid as well as the increased fluid pressure within the hydraulic system. However, in alternative embodiments, the controller 126 may be configured to control the operation of the pump 104 in any other suitable manner.

Adjusting the operating speed range of the pump 104 when the temperature of the hydraulic fluid is below the predetermined minimum fluid temperature may allow the pump to operate at an operating speed that quickly heats the hydraulic fluid, while minimizing energy consumption. Specifically, such an adjustment prevents the operating speed of the pump 104 from falling below an operating speed at which the hydraulic fluid is quickly heated (e.g., the adjusted minimum operating speed value) when the temperature of the hydraulic fluid is below the predetermined minimum fluid temperature. Moreover, adjusting the operating speed range prevents the operating speed of the pump from being unnecessarily increased when the operating speed of the pump is already sufficient to quickly heat the hydraulic fluid, thereby reducing the energy consumption of the electric work vehicle. As such, adjusting the operating speed range of the pump as opposed to simply increasing the operating speed of the pump 104 when the temperature of the hydraulic fluid is below the predetermined minimum fluid temperature improves the operation of the backhoe loader 10 during low temperature operating conditions.

Additionally, in one embodiment, the controller 126 may be configured to halt the operation of the fan(s) 122 when the monitored temperature of the hydraulic fluid is below the predetermined minimum fluid temperature. As described above, one or fans 122 may be configured to generate an airflow across one or more heat exchangers 120 through which the hydraulic fluid flows. In this respect, the cooling provided by the fan(s) 122 may reduce the rate at which the hydraulic fluid is heated. As such, when the monitored temperature of the hydraulic fluid is below the predetermined minimum fluid temperature, the controller 126 may actuate one or more switches (not shown) to halt the flow of electric power from the battery module 80 (FIG. 1) to the fan(s) 122, thereby shutting off the fan(s) 122. Such halting of the fan(s) 122 may allow the operation of the pump 104 within adjusted operating speed to more quickly heat the hydraulic fluid.

Referring now to FIG. 3, a flow diagram of one embodiment of a method 200 for heating the hydraulic fluid of an electric work vehicle is illustrated in accordance with aspects of the present subject matter. In general, the method 200 will be described herein with reference to the electric work vehicle 10 and the system 100 described above with reference to FIGS. 1 and 2. However, the disclosed method 200 may generally be implemented with any electric work vehicle having any suitable electric vehicle configuration and/or within any system having any suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 may include receiving, with one or more computing devices, sensor data indicative of a temperature of hydraulic fluid. For instance, as described above, the controller 126 may be configured to receive data from the temperature sensor 124 (e.g., via the communicative link 132) indicative of the temperature of the hydraulic fluid within the hydraulic system of the backhoe loader 10.

Additionally, at (204), the method 200 may include monitoring, with the one or more computing devices, the temperature of the hydraulic fluid relative to a predetermined minimum fluid temperature based on the received sensor data. For instance, as described above, the controller 126 may be configured to monitor the temperature of the hydraulic fluid relative to a predetermined minimum fluid temperature based on the received sensor data.

Moreover, as shown in FIG. 3, at (206), when the monitored temperature of the hydraulic fluid falls below the predetermined minimum fluid temperature, the method 200 may include adjusting, with the one or more computing devices, an operating speed range of a pump. For instance, as described above, when the monitored temperature of the hydraulic fluid falls below the predetermined minimum fluid temperature, the controller 126 may be configured to adjust the operating speed range of the pump 104.

It is to be understood that the steps of the method 200 are performed by the controller 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 126 described herein, such as the method 200, is implemented in software code or instructions which are tangibly stored on a tangible computer readable medium. The controller 126 loads the software code or instructions via a direct interface with the computer readable medium or via a wired and/or wireless network. Upon loading and executing such software code or instructions by the controller 126, the controller 126 may perform any of the functionality of the controller 126 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An electric work vehicle, comprising:
a chassis;
an electric motor supported on the chassis, the electric motor configured to propel the electric work vehicle in a direction of travel;
an implement adjustably coupled to the chassis;
a hydraulic actuator configured to adjust a position of the implement relative to the chassis;
a pump configured to supply hydraulic fluid to the hydraulic actuator, the pump being operable within an operating speed range extending between a minimum operating speed value and a maximum operating speed value;
a sensor configured to capture data indicative of a temperature of the hydraulic fluid; and
a controller communicatively coupled to the sensor, the controller configured to:
monitor the temperature of the hydraulic fluid when above a predetermined minimum fluid temperature as the pump is operating within the operating speed range; and
adjust the operating speed range of the pump by increasing at least one of the minimum operating speed value or the maximum operating speed value when the monitored temperature of the hydraulic fluid falls below the predetermined minimum fluid temperature.

2. The electric work vehicle of claim 1, wherein the controller is further configured to adjust the operating speed range of the pump by increasing the minimum operating speed when the monitored temperature of the hydraulic fluid falls below the predetermined minimum fluid temperature.

3. The electric work vehicle of claim 1, wherein the controller is further configured to adjust the operating speed range of the pump by increasing the maximum operating speed when the monitored temperature of the hydraulic fluid falls below the predetermined minimum fluid temperature.

4. The electric work vehicle of claim 1, further comprising:
a cooling fan configured to cool the hydraulic fluid, wherein the controller is further configured to halt an operation of the cooling fan when the monitored temperature of the hydraulic fluid falls below the predetermined minimum fluid temperature.

5. The electric work vehicle of claim 1, wherein the implement comprises at least one of a loader assembly or a backhoe assembly.

6. The electric work vehicle of claim 1, wherein the work vehicle corresponds to a backhoe loader.

7. A system for heating hydraulic fluid of an electric work vehicle, the system comprising:
a pump configured to supply hydraulic fluid to a component of the electric work vehicle;
a sensor configured to capture data indicative of a temperature of the hydraulic fluid; and
a controller communicatively coupled to the sensor, the controller configured to:
monitor the temperature of the hydraulic fluid when above a predetermined minimum fluid temperature based on the data received from the sensor; and
adjust an operating speed range of the pump by increasing at least one of a minimum operating speed value or a maximum operating speed value when the monitored temperature of the hydraulic fluid falls below the predetermined minimum fluid temperature.

8. The system of claim 7, wherein the controller is further configured to:
compare a current operating speed of the pump to the adjusted operating speed range; and
initiate an adjustment to the current operating speed of the pump when the current operating speed of the pump falls outside of the adjusted operating speed range.

9. The system of claim 7, wherein, when adjusting the operating speed range, the controller is further configured to increase the minimum operating speed value of the operating speed range.

10. The system of claim 7, wherein, when adjusting the operating speed range, the controller is further configured to increase the maximum operating speed value of the operating speed range.

11. The system of claim 10, wherein, when increasing the maximum operating speed value of the operating speed range, the controller is further configured to increase the maximum operating speed value to a maximum operating speed of the pump.

12. The system of claim 7, wherein:
when adjusting the operating speed range, the controller is further configured to adjust the operating speed range of the pump from a first operating speed range to a second operating speed range;
a maximum operating speed value of the second operating speed range is greater than a maximum operating speed value of the first operating speed range; and
a minimum operating speed value of the second operating speed range is greater than a minimum operating speed value of the first operating speed range.

13. The system of claim 12, wherein the maximum operating speed of the first operating speed range is greater than the minimum operating speed of the second operating speed range.

14. The system of claim 7, further comprising:
a cooling fan configured to cool the hydraulic fluid, wherein the controller is further configured to halt an operation of the cooling fan when the monitored temperature of the hydraulic fluid falls below the predetermined minimum fluid temperature.

15. The system of claim 7, wherein the pump is rotationally driven by an electric motor.

16. A method for heating hydraulic fluid of an electric work vehicle, the electric work vehicle comprising a pump configured to supply the hydraulic fluid to a component of the electric work vehicle, the method comprising:
receiving, with one or more computing devices, sensor data indicative of a temperature of the hydraulic fluid;
monitoring, with the one or more computing devices, the temperature of the hydraulic fluid when above a predetermined minimum fluid temperature based on the received sensor data; and
when the monitored temperature of the hydraulic fluid falls below the predetermined minimum fluid temperature, adjusting, with the one or more computing devices, an operating speed range of the pump by increasing at least one of a minimum operating speed value or a maximum operating speed value.

17. The method of claim 16, further comprising:
comparing, with the one or more computing devices, a current operating speed of the pump to the adjusted operating speed range; and
initiating, with the one or more computing devices, an adjustment to the current operating speed of the pump when the current operating speed of the pump falls outside of the adjusted operating speed range.

18. The method of claim 16, wherein adjusting the operating speed range comprises increasing, with the one or more computing devices, the minimum operating speed value of the operating speed range.

19. The method of claim 16, wherein:
adjusting the operating speed range comprises adjusting, with the one or more computing devices, the operating speed range of the pump from a first operating speed range to a second operating speed range;
a maximum operating speed value of the second operating speed range is greater than a maximum operating speed value of the first operating speed range; and
a minimum operating speed value of the second operating speed range is greater than a minimum operating speed value of the first operating speed range.

20. The method of claim 16, wherein the electric work vehicle further comprises a cooling fan configured to cool the hydraulic fluid, the method further comprising:
halting, with the one or more computing devices, an operation of the cooling fan when the monitored temperature of the hydraulic fluid falls below the predetermined minimum fluid temperature.

* * * * *